United States Patent
Komiya et al.

(10) Patent No.: US 8,149,294 B2
(45) Date of Patent: Apr. 3, 2012

(54) IMAGE CAPTURING DEVICE WHICH SETS COLOR CONVERSION PARAMETERS BASED ON AN IMAGE SENSOR AND SEPARATE LIGHT SENSOR

(75) Inventors: Yasuhiro Komiya, Hino (JP); Shinya Kono, Hachioji (JP); Masanori Mitsui, Machida (JP); Akira Matsushita, Hachioji (JP)

(73) Assignee: Olympus Corporation, Tokyo (JP)

(\*) Notice: Subject to any disclaimer, the term of this patent is extended or adjusted under 35 U.S.C. 154(b) by 367 days.

(21) Appl. No.: 12/477,609

(22) Filed: Jun. 3, 2009

(65) Prior Publication Data
US 2009/0295947 A1 Dec. 3, 2009

(30) Foreign Application Priority Data
Jun. 3, 2008 (JP) .................................. 2008-145406

(51) Int. Cl.
*H04N 9/73* (2006.01)
*H04N 5/225* (2006.01)

(52) U.S. Cl. ..................................... 348/223.1; 348/375

(58) Field of Classification Search .... 348/222.1–225.1, 348/374–375
See application file for complete search history.

(56) References Cited

U.S. PATENT DOCUMENTS

| | | | |
|---|---|---|---|
| 7,432,961 B2 * | 10/2008 | Takeshita | 348/227.1 |
| 7,893,986 B2 * | 2/2011 | Butterworth | 348/340 |
| 2001/0050769 A1 * | 12/2001 | Fujinaka | 356/121 |
| 2003/0076424 A1 * | 4/2003 | Minakuti et al. | 348/223.1 |
| 2006/0200356 A1 * | 9/2006 | Wan | 705/1 |
| 2008/0303922 A1 * | 12/2008 | Chaudhri et al. | 348/231.99 |

FOREIGN PATENT DOCUMENTS

| | | |
|---|---|---|
| JP | 09-172649 | 6/1997 |
| JP | 2005-260480 | 9/2005 |

\* cited by examiner

*Primary Examiner* — Daniel M Pasiewicz
(74) *Attorney, Agent, or Firm* — Scully, Scott, Murphy & Presser, P.C.

(57) ABSTRACT

An imaging device 11, in which photoelectric conversion is performed by an imaging element 16 for acquiring an image of a subject formed by the photographing lens 12, comprising a light source estimation unit 31 for generating estimated light source information for estimating a light source of the subject, on the basis of an image signal acquired by the imaging device 16; an light source sensor 18 for detecting a spectrum of the light source; a light source sensor information calculation unit 32 for generating a light source sensor information including the spectrum based on the spectrum; a color conversion parameter calculation unit 33 for calculating the color conversion parameters of the image signal based on the estimated light source information and the light source sensor information; and, a color conversion processing unit 34 for performing color conversion of the image signal by using the color conversion parameters. This allows the imaging device to realize precise color reproduction with an improved accuracy.

7 Claims, 11 Drawing Sheets

| AUTO | normal mode |
| --- | --- |
| | setting scene interlocking movement mode |
| | AWB mode |
| MANUAL | light source sensor mode |
| | one-touch light source sensor mode |
| | light source selection mode |
| | one-touch WB mode |

FIG. 7

| | light source mode | information to be used for processing | | | | |
|---|---|---|---|---|---|---|
| | | estimated light source information | light source sensor information | setting scene information | camera information | selected light source information |
| AUTO | normal mode | ○ | ○ | | ○ | |
| | setting scene interlocking movement mode | ○ | ○ | ○ | | |
| | AWB mode | ○ | | | | |
| MANUAL | light source sensor mode | | ○ | | | |
| | one-touch light source sensor mode | | ○ | | | |
| | light source selection mode | | | | | ○ |
| | one-touch WB mode | ○ | | | | |

IMAGE CAPTURING DEVICE WHICH SETS COLOR CONVERSION PARAMETERS BASED ON AN IMAGE SENSOR AND SEPARATE LIGHT SENSOR

CROSS-REFERENCE TO APPLICATIONS

The present application claims the priority of Japanese Patent Application No. 2008-145406 filed on Jun. 3, 2008, which is herein incorporated in its entirety for reference.

FIELD OF THE INVENTION

The present invention relates to an imaging device for taking a subject image, which is formed by an imaging lens, through photoelectric conversion carried out by the imaging element.

BACKGROUND OF THE INVENTION

Such an imaging device is called a digital camera and is widely used. In addition, a recent digital camera has been improved in color reproducibility as well as in resolution. A known digital camera is connected to a light source sensor which detects light source sensor information such as illumination intensity of illumination light, color temperature, spectrum, and etc., so that light source sensor information at the time of shooting is detected, and thus, color reproducibility of a subject can be improved by color conversion processing of image signal of the subject, based on the detected light source information (refer to, for example, JP2005260480).

However, an investigation performed by the present inventors revealed following problems to be solved in the imaging device as in JP2005260480. When illumination light from the same light source (in this case, the sun) is irradiated onto a light source sensor 111, which is connected to a camera 110, and onto a subject 112, as in the case of outdoor photographing shown in FIG. 13(*a*), there is no difficulty in improving the color reproducibility of the subject.

Figure 13:
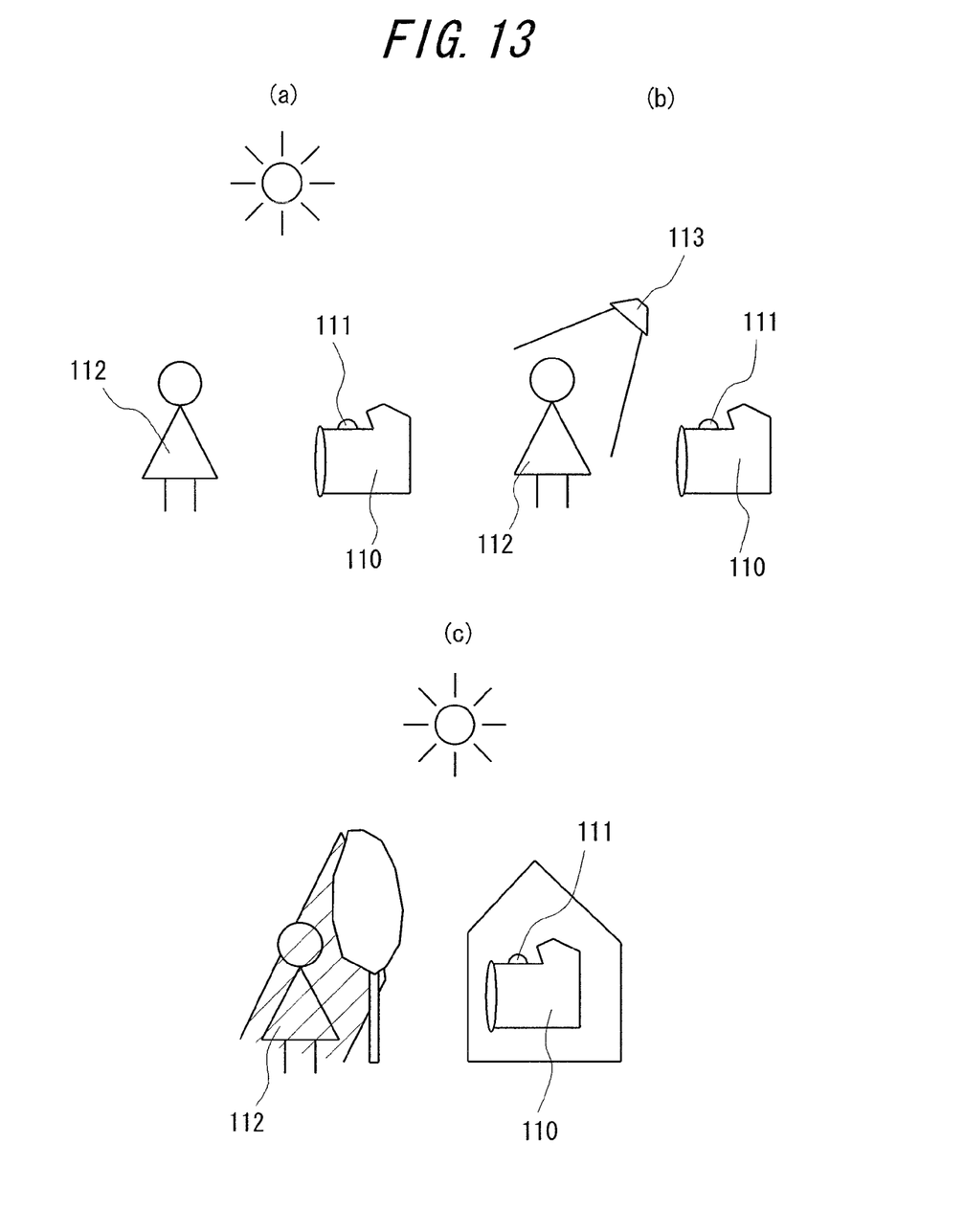
FIG. 13 is a drawing for explaining conventional problems.

However, in those cases wherein illumination from the illumination light 113, which illuminates the subject 112, is not irradiated onto the light source sensor 111 as in the situation of studio photographing shown in FIG. 13(*b*), and wherein not only sunlight but also indoor illumination is irradiated onto the light source sensor when photographing the subject 112 in outdoor shade from indoor position as shown in FIG. 13(*c*), the reproduced color may differ significantly from the real one, if color conversion processing is performed on the basis of information of light source sensor 111.

Thus, regarding above problems, the objective of the present invention is to provide an imaging device adopted to realize more precise color reproduction.

BRIEF SUMMARY OF THE INVENTION

For attaining the above objectives, the present invention concerning claim 1 is related to an imaging device for taking an subject image formed by an imaging lens, wherein the subject image is photo-electrically converted into an image signal by the imaging element, comprising;

a light source estimation unit for generating estimated light source information for estimating a light source of the subject, based on the image signal acquired by the imaging element, a light source sensor for detecting spectrum information of an illumination light, a light source sensor information calculation unit for generating light source sensor information including the spectrum information, based on the spectrum information, a color conversion parameter calculation unit for calculating a color conversion parameter of the image signal, based on the estimated light source information and the light source sensor information, and, a color conversion processing unit for performing color conversion processing of the image signals by using the color conversion parameter.

The invention concerning claim 2 is characterized by the imaging device as in claim 1, wherein the color conversion parameter calculation unit comprising;

a light source setting unit for setting light source information of the subject, based on the light source sensor information and the estimated light source information, and, a parameter calculation unit for calculating the color conversion parameter, based on the light source information being set.

The invention concerning claim 3 is characterized by the imaging device as in claim 1, wherein the estimated light source information includes brightness, color temperature or spectrum information.

The invention concerning claim 4 is characterized by the imaging device as in claim 1, wherein the light source sensor information includes brightness or color temperature information.

The invention concerning claim 5 is characterized by the imaging device as in claim 2 further comprising;

a light source mode setting unit for selecting one light source mode from a plurality of high source modes and setting it as a light source mode, wherein the color conversion parameter calculation unit calculates color conversion parameters according to the light source mode being set.

The invention concerning claim 6 is characterized by the imaging device as in claim 5, wherein the color conversion parameter calculation unit further comprises a processing data selection unit for selecting processing data to be used in the setting of the light source information in the light source setting unit, according to the light source mode being set.

According to the present invention, color reproduction with improved accuracy can be realized by calculating the color conversion parameter for performing color conversion of the image signal, based on estimated light source information, which is estimated by the image signal acquired by the imaging element, and the light source sensor information derived from the illumination light spectrum detected by the light source sensor.

DESCRIPTION OF THE PREFERRED EMBODIMENTS

In the followings, embodiments of the present invention will be described by referring to the figures.

Figure 1:
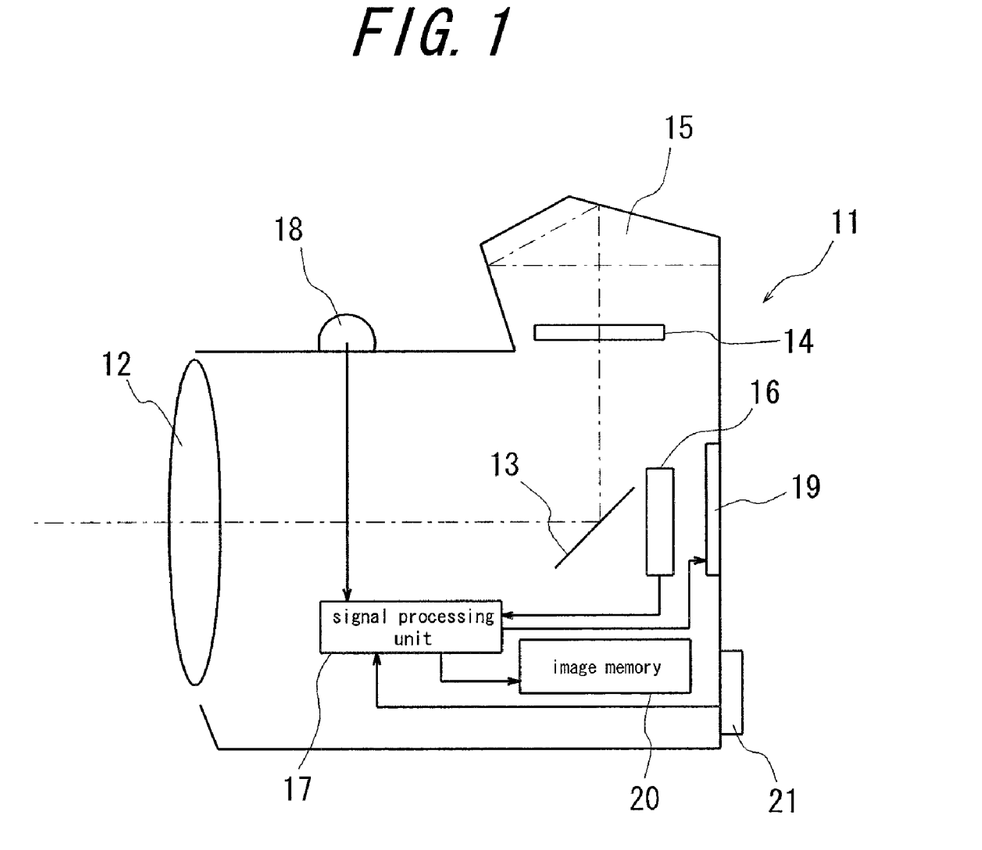
FIG. 1 shows a schematic structure of an essential part of the imaging device according to an embodiment of the present invention.

FIG. 1 shows a schematic structure of an essential part of the imaging device according to an embodiment of the present invention. In its non-photographing status, wherein the release button (not-shown) is not manipulated, the imaging device 11 can form an image of a subject (not shown), on the focusing screen 14, by using the imaging lens 12 and flip up mirror 13, and the resultant subject image can be seen through the finder optics system 15. In its photographing status, wherein the release button is manipulated, the flip up mirror 13 is flipped up and the subject image is formed on the imaging element 16, and the image is subject to photoelectric conversion, and the resultant image signal is supplied to the signal processing unit 17. The imaging element 16 comprises, for example, red (R), green (G), blue (B) color filters in Bayer arrangement, which are not shown, on its incident side, and supplies the image signals of three bands, i.e., RGB bands, to the signal processing unit 17.

The imaging device 11 has a light source sensor 18 detecting a spectrum of illumination light around a camera, and its output is supplied to the signal processing unit 17. The signal processing unit 17 generates estimated light source information from the image signals acquired by the imaging element 16, according to the light source mode mentioned herein after. Then, color conversion is carried out for the image signal, based on the estimated light source information and the output of light source sensor 18, and the color converted image signal is supplied to a monitor 19, such as LCD, and is displayed on the monitor 19, while the signal is also supplied to the image memory 20 for storing. In addition, light source mode of the signal processing unit 17 can be configured by a user through manipulation of a setting button 21.

Figure 2:
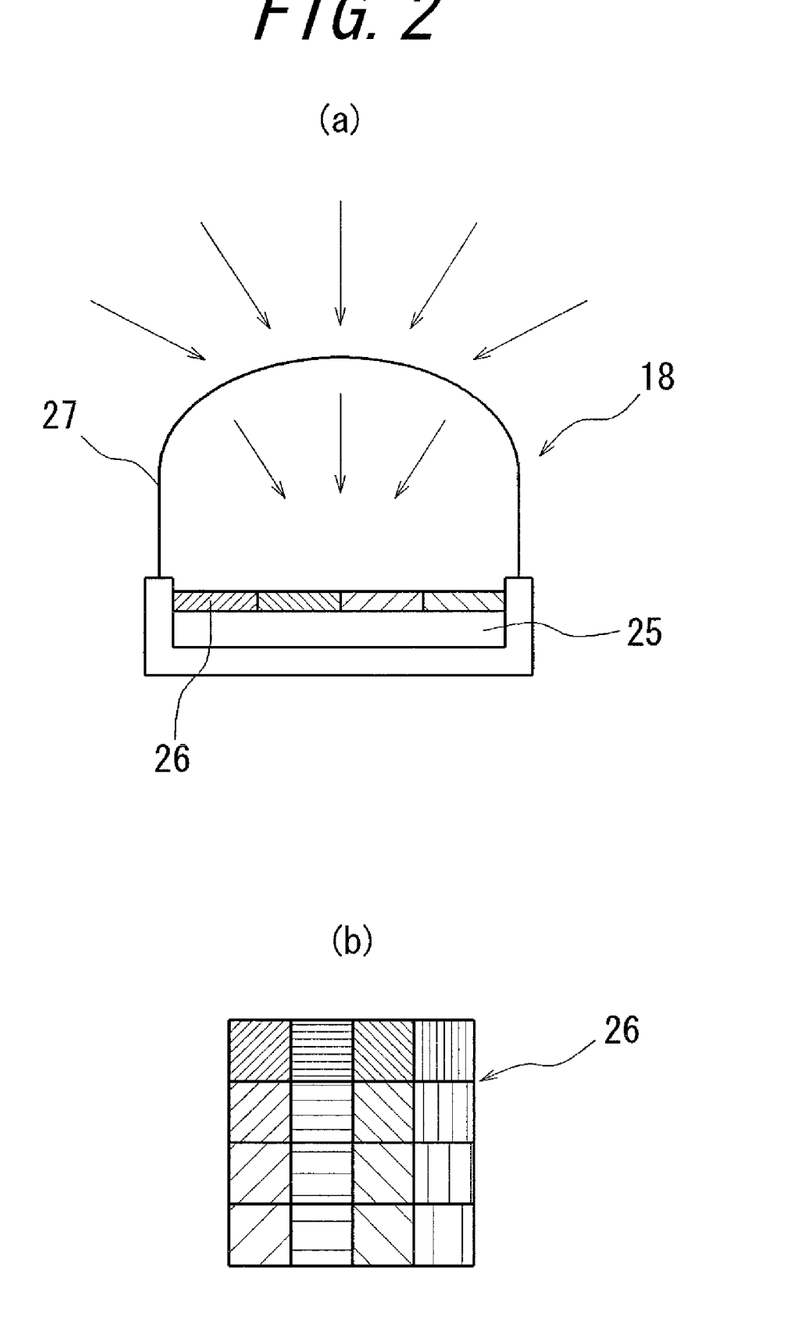
FIG. 2 shows an exemplary structure of the light source sensor shown in FIG. 1.

FIG. 2 shows an example of light source sensor 18 as in FIG. 1, and FIG. 2(a) is a schematic cross-sectional view, and FIG. 2(b) is a partial planar view. As shown in FIG. 2(a), the light source sensor 18 has a two-dimensional array sensor 25 with 4*4 pixels and color filters 26 arranged thereupon, and an integrating sphere 27. To comply with the two-dimensional array sensors 25 with 4*4 pixels, the color filters 26 consists of 4*4 different color filters, as shown in FIG. 2(b). The light source sensor 18 receives the illumination light around the imaging device 11 with the two dimensional array sensor 25 through the integrating sphere 27 and the color filters 26, and supplies 16 colors of spectrum information to the signal processing unit 17.

Figure 3:
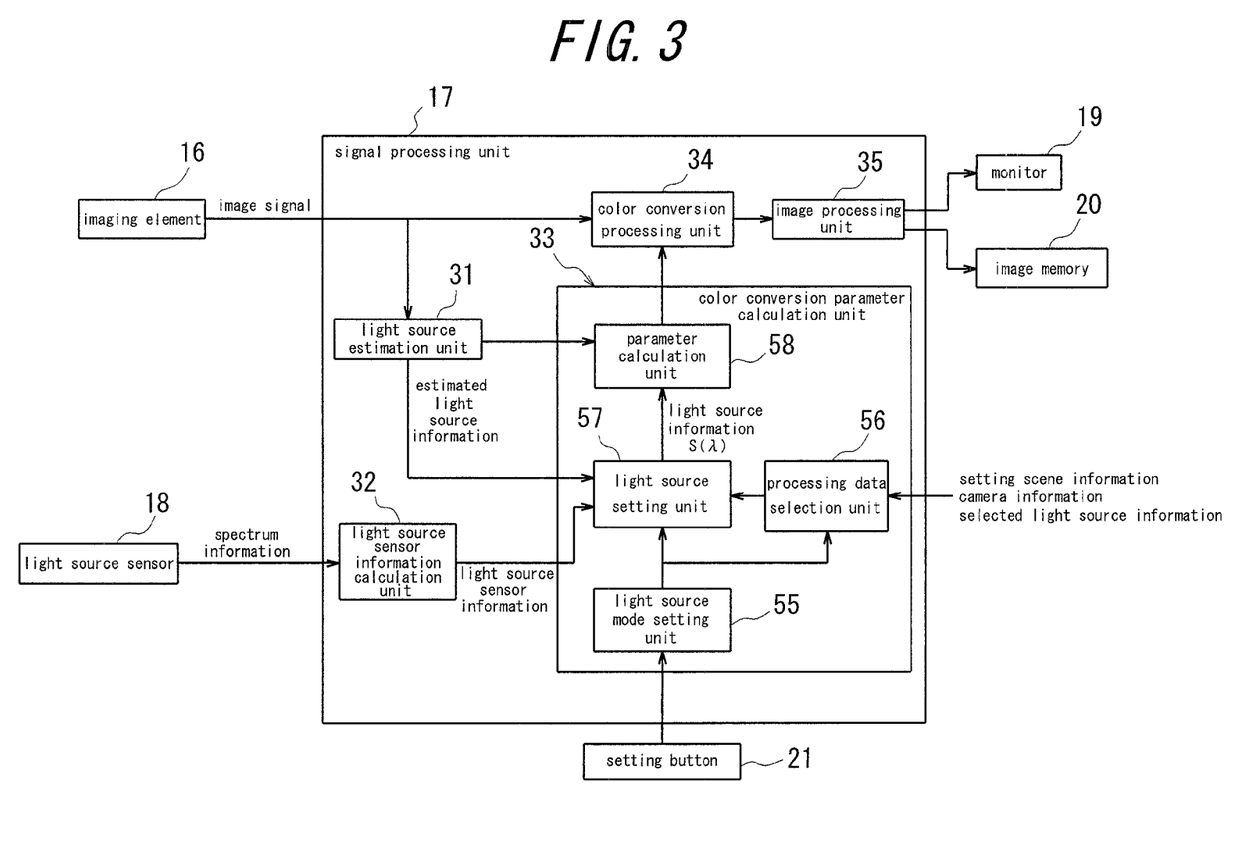
FIG. 3 is a functional block diagram showing the structure of an essential part of the signal processing unit shown in FIG. 1.

FIG. 3 is a functional block chart showing structure of an essential part of the signal processing unit 17 as in FIG. 1. The signal processing unit 17 has a light source estimation unit 31, a light source sensor information calculation unit 32, a color conversion parameter calculation unit 33, a color conversion processing unit 34 and an image processing unit 35.

Figure 4:
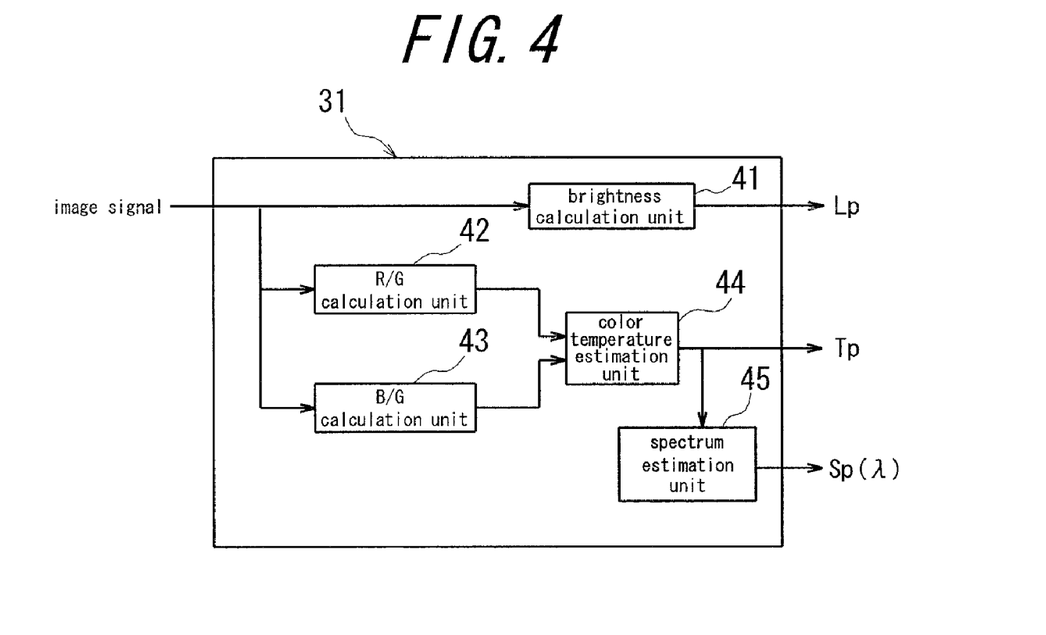
FIG. 4 is a block diagram showing the structure of the light source estimation unit shown in FIG. 3.

The light source estimation unit 31, which generates the estimated light source information to estimate an illumination source of a subject, based on an image signal from the imaging element 16, comprises a brightness calculation unit 41, an R/G calculation unit 42, a B/G calculation unit 43, a color temperature estimation unit 44 and a spectrum estimation unit 45, as shown in FIG. 4. Here, the brightness calculation unit 41 calculates brightness Lp of the image signal, and supplies the result to the color conversion parameter calculation unit 33. The R/G calculation unit 42 uses an R signal and a G signal among image signals, and calculates the R/G ratio, and its resultant value is supplied to the color temperature estimation unit 44. In the same manner, the B/G calculation unit 43 uses a B signal and a G signal among image signals, and calculates the B/G ratio, and the resultant value is supplied to the color temperature estimation unit 44.

The color temperature estimation unit 44 calculates a color temperature Tp for estimating the used light source (sunlight, fluorescent lamp, halogen lamp, and etc.) by using the output values from the R/G calculation unit 42 and the B/G calculation unit 43, on the basis of the chromaticity value of the image signal, as the conventional auto-white balancing processing, and supplies the resultant value to the color conversion parameter calculation unit 33 as well as to a spectrum specifying unit 45. The spectrum specifying unit 45 estimates the spectrum Sp ($\lambda$) of the image signal, based on the color temperature Tp from the color temperature estimation unit 44, and supplies the resultant value to the color conversion parameter calculation unit 33. In other words, in this embodiment, the brightness Lp, the color temperature Tp and the spectrum Sp ($\lambda$) are calculated based on the image signal from the imaging element 16, at the light source estimation unit 31, and those resultant values are supplied to the color conversion parameter calculation unit 33 as the estimated light source information for estimating the illumination light source of the subject.

Figure 5:
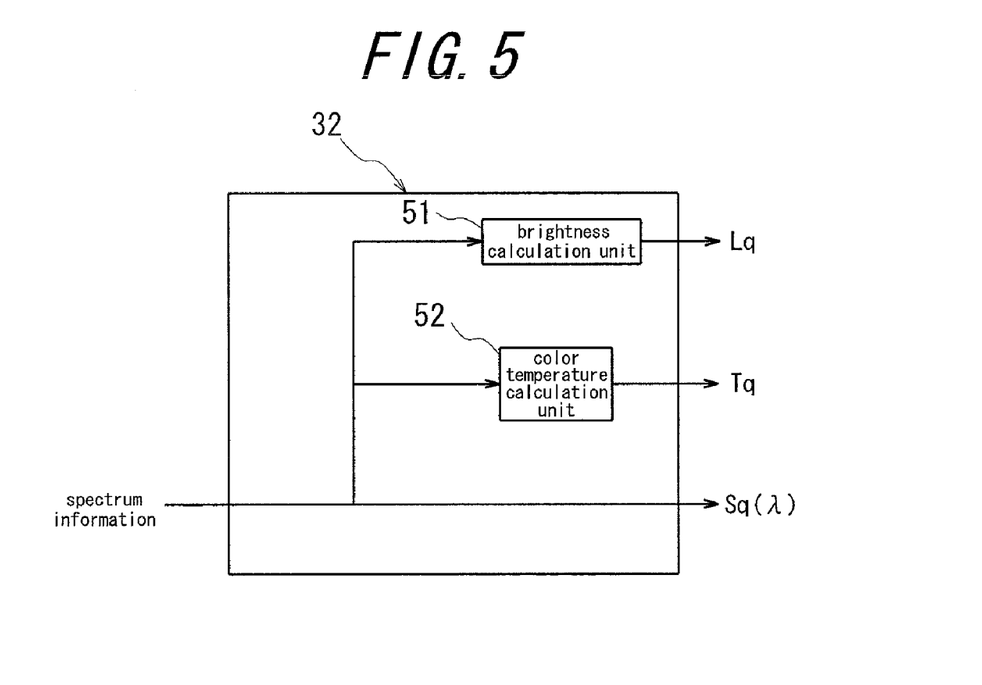
FIG. 5 is a block diagram showing structure of the light source sensor information calculation unit shown in FIG. 3.

Based on the illumination light spectrum acquired by the light source sensor 18, the light source sensor information calculation unit 32 generates the light source sensor information including the spectrum information, as shown in FIG. 3, and this unit 32 comprises a brightness calculation unit 51 and a color temperature calculation unit 52, as shown in FIG. 5. Here, the brightness calculation unit 51 calculates the brightness Lq based on the spectrum Sq ($\lambda$) from the light source sensor 18, and supplies the resultant value to the color conversion parameter calculation unit 33.

The color temperature calculation unit 52 calculates the color temperature Tq for estimating a light source of illumination light irradiated onto the light source sensor 18, by using a known method, based on the spectrum Sq ($\lambda$) from light source sensor 18, and supplies the resultant value to the color conversion parameter calculation unit 33. Thus, according to the present embodiment, in the light source sensor information calculation unit 32, the brightness Lq and the color temperature Tq are calculated, based on the spectrum Sq ($\lambda$) from light source sensor 18, and the spectrum Sq ($\lambda$), the brightness Lq and the color temperature Tq are supplied to the color conversion parameter calculation unit 33, as the light source sensor information.

Figure 6:
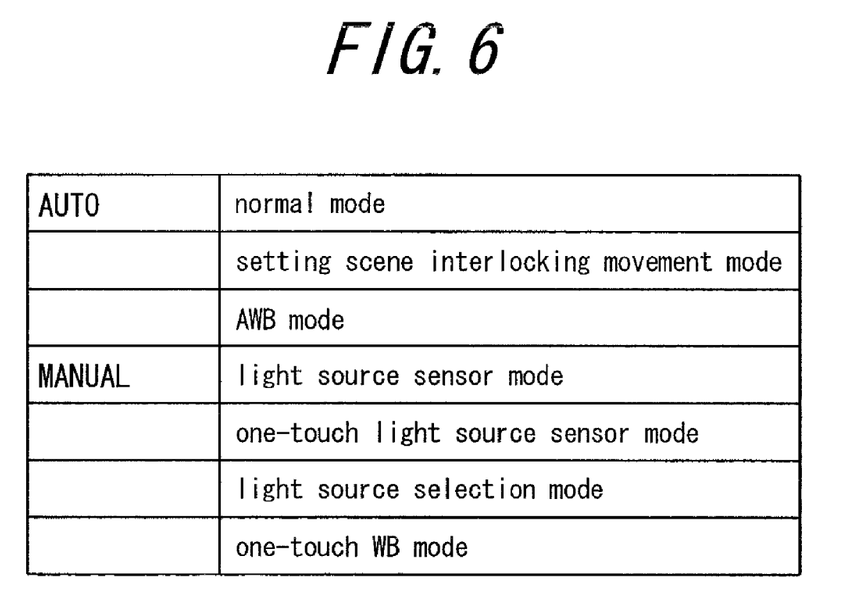
FIG. 6 shows an example of a light source mode setting menu in the light source mode setting unit shown in FIG. 3.

The color conversion parameter calculation unit 33 calculates the color conversion parameters to be used in the color conversion of the image signal from the imaging element 16, based on estimated light source information from the light source estimation unit 31 and the light source sensor information from the light source sensor information calculation unit 32, and comprises a light source mode setting unit 55, a processing data selection unit 56, a light source setting unit 57 and a parameter calculation unit 58. The light source mode setting unit 55 displays a light source mode setting menu having plurality of light source modes on the display unit 19 shown in FIG. 1, and notifies the light source mode being set through the manipulation of the setting button 21 to the processing data selection unit 56 and the light source setting unit 57. In this embodiment, the menu shown in FIG. 6 is displayed as a light source mode setting menu, and one light source mode is set. For example, a normal mode is set as a default in FIG. 6.

According to the light source mode being set in the light source mode setting unit 55, the processing data selection unit 56 selects the processing data to be used in the setting process of the light source information, which is described in detail in the following part, and supplies it to the light source setting unit 57. In the present embodiment, required processing data is selected from among the processing data, such as setting scene information, camera information, and selected light source information, according to the light source mode being set.

The setting scene information is scene mode information being set by a user, and a desired one mode is selected from, such as portrait, landscape, landscape & figure, night view, night view & figure, child, sports, a high-key, low-key, blurring reduction, macro, nature macro, candle, twilight, fireworks, documents, panorama, beach & snow, underwater wide angle, underwater macro, and etc. The camera information is information of the imaging device 11 including a focus position of the photographing lens 12. In addition, the selected light source information is the light source information being set by a user as the light source mode in the "light source selection mode". In this selection, desired one mode is selected from, for example, "automatic", "halogen lamp", "fluorescent lamp", "sunlight", and etc.

According to the light source mode being set through the light source mode setting unit 55, the light source setting unit 57 sets the light source information S ($\lambda$) of the subject, based on the estimated light source information from the light source estimation unit 31, light source sensor information from the light source sensor information calculation unit 32, and the processing data selected in the processing data selection unit 56, and supplies the selected light source information S ($\lambda$) to the parameter calculation unit 58. In this embodiment, corresponding to light source mode being set, the light source information S ($\lambda$) is set by using information shown in FIG. 7.

Figure 7:
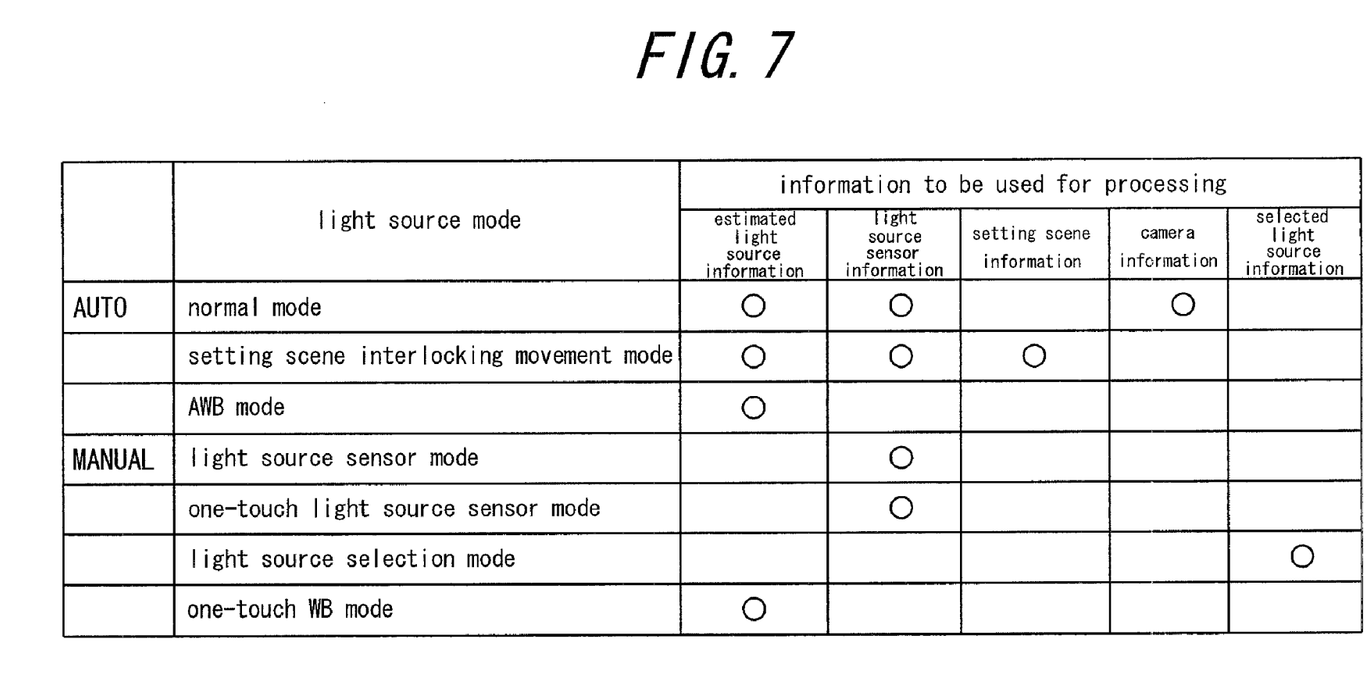
FIG. 7 shows an example of information to be used according to the light source mode being set, in the light source mode setting unit shown in FIG. 3.

In other words, when operated in the "normal mode", the light source information S ($\lambda$) is set based on the estimated light source information from the light source estimation unit 31, the light source sensor information from the light source sensor information calculation unit 32, and the selected camera information selected in the processing data selection unit 56. In the "setting scene interlocking movement mode", either the estimated light source information from light source estimation unit 31 or the light source sensor information from light source sensor information calculation unit 32 is selected, according to the setting scene information which is preliminarily set by a user and selected in the processing data selection unit 56, and the selected information is used for setting the light source information S ($\lambda$). For example, when "landscape" scene mode is selected, the estimated light source information is selected, and its spectrum Sp ($\lambda$) is set as the light source information S ($\lambda$). Similar to the conventional method, in "AWB mode", i.e., "automatic white balance mode", the spectrum Sp ($\lambda$) of estimated light source information is set as the light source information S ($\lambda$), without using the light source sensor information.

A user consciously decides whether to use the light source sensor 18, in the "MANUAL" modes. For example, the "light source sensor mode" is a mode, which is always set in the case where the light source sensor 18 is used. In this mode, the light source sensor information detected by the light source sensor 18, more specifically, the spectrum Sq ($\lambda$) of the light source sensor information acquired synchronously with photographing, is set as the light source information S ($\lambda$).

The "one-touch light source sensor mode", is a mode which is set in the case where the imaging device 11 is placed close to the subject before photographing, and the light source sensor information is acquired through a flip of a switch of the light source sensor 18, separately form the actual photographing of the subject. In this mode, the spectrum Sq ($\lambda$) of the light source sensor information acquired through one flip of a switch is set as the light source information S ($\lambda$). Thus, this "one-touch light source sensor mode" is advantageous in the case where only the subject is illuminated, as the case of studio photography. In other words, in performing studio photography, a photographer normally decides exposure by bringing an exposure meter close to the photographing object. Similarly, detecting the spectrum Sq ($\lambda$) of illumination light irradiated onto the photographing object is advantageous. For this case, it is preferable for the light source sensor 18 to be configured separately from the imaging device 11, but to allow communication with the imaging device 11.

The "light source selection mode" is a mode in which a user selects the light source for illuminating the subject. In this mode, the selected light source information, that is, information of the selected light source is set as the light source information S ($\lambda$). The "one-touch WB mode" is a mode which is set in the case of adjusting WB by photographing a white paper before photographing the subject, so that WB adjustment can be performed, based on the whiteness of the photographed paper. In this mode, the spectrum Sp ($\lambda$) provided from the light source estimation unit 31 is set as light source information S ($\lambda$), based on the image signal from the imaging element 16.

In FIG. 3, the parameter calculation unit 58 calculates color conversion parameters by using a known method based on the light source information S ($\lambda$) being set, from the light source setting unit 57, the estimated light source information from the light source estimation unit 31, the spectrum sensitivity of the imaging element 16, the color space information, and etc. The color conversion parameter is, for instance, a matrix coefficient. In the cases where the image signal consists of three bands as in the embodiment of the present invention, it can be a 3*3 matrix coefficient, and where the image signal consists of, for instance, six bands, it can be a 6*3 matrix coefficient. The parameter calculation unit 58 supplies the calculated color conversion parameters to the color conversion processing unit 34.

The color conversion processing unit 34 performs color conversion of the image signal being sent from the imaging element 16, by using the color conversion parameters calculated in the parameter calculation unit 58, and supplies the converted signal to the image processing unit 35. The image processing unit 35 processes the image signal for displaying. The image signal is subjected to color conversion processing at the color conversion processing unit 34, and displayed on the display unit 19, and stored in the image memory unit 20, through some required image processing, such as image compression processing.

Figure 8:
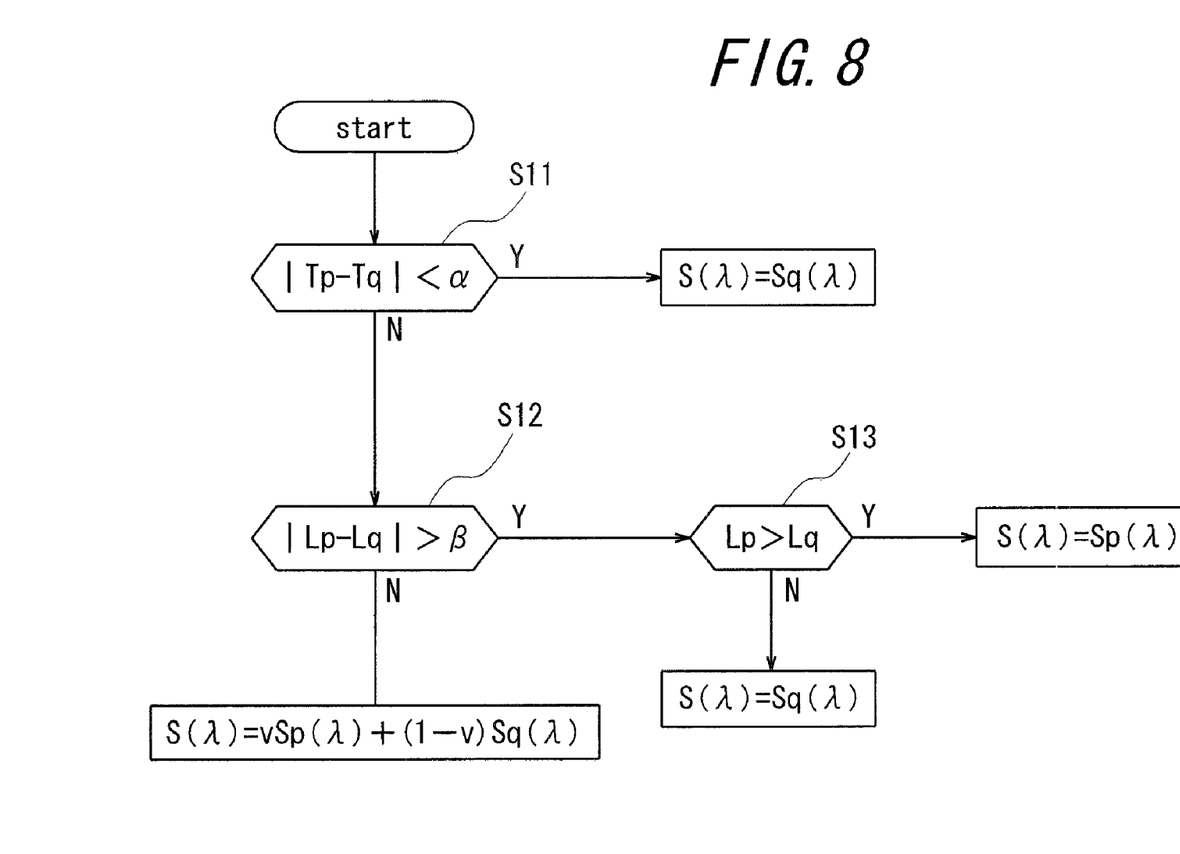
FIG. 8 is a flow chart explaining the operation in a "normal mode", being set by the light source setting unit shown in FIG. 3.

In the followings, a setting procedure of the light source information S (λ) performed by the light source setting unit 57 is described in detail by referring to the flow chart in FIG. 8. In this case, the "normal mode" is set as the light source mode at the mode setting unit 55.

In the "normal mode" photographing, an absolute value, |Tp-Tq|, is subjected to a determination whether it is less than a predetermined value α or not (step S11). In this case, the absolute value is based on the difference of the color temperature Tp of the photographing object illumination light supplied form the light source estimating unit 31 and the color temperature Tq of illumination light irradiated onto the light source sensor 18 derived from the light source information calculation unit 32. As a result, when the value is less than predetermined value α, namely, both color temperatures are almost the same, almost the same illumination is assumed to be irradiated onto the object and the light source sensor 18. In such case, the spectrum Sq (λ) acquired by the light source sensor 18, which contains detailed spectrum information, is set as the light source information S (λ).

In contrast, when the absolute value |Tp-Tq| is regarded as above the predetermined value α, in step S11, the absolute value |Lp-Lq| is subjected to determination whether it is less than a predetermined value β or not (step S12), subsequently. In this case, the absolute value, |Lp-Lq|, is based on the difference of the brightness Lp of the subject illumination light from the light source estimating unit 31 and the brightness Lq of the illumination light irradiated onto the light source sensor 18 derived from the light source information calculation unit 32. As a result, when the value is grater than predetermined value β, then, both values, Lp and Lq, are compared (step S13) each other, and the value with higher spectrum will be used. Namely, in case of Lp>Lq, the spectrum Sp (λ) of the subject illumination light is set as the light source information S (λ), and in case of Lp<Lq, spectrum Sq (λ) acquired by the light source sensor 18 is set as the light source information S (λ).

On the other hand, when the absolute value |Lp-Lq| is less than the predetermined value β, in the step S12, both the spectrum Sp (λ) of the object illumination light and the spectrum Sq (λ) acquired by the light source sensor 18 are used to calculate the light source information S (λ), by an equation, for instance, Sq (λ)=vSp (λ)+(1-v)Sq (λ), and the resultant S (λ) value is set. Here, v stands for a balancing coefficient for Sp (λ) and Sq (λ), and ranges 0<v<1. The value of v is calculated by the camera information from the processing data selection unit 56. Depending on the focus value of the camera information, for example, when the object is considerably away from the imaging device 11, the spectrum Sp (λ) of the object is used on a priority basis, and when the object is near the device, the spectrum Sq (λ) of the light source sensor 18 is used on a priority basis.

According to the present embodiment, by changing the light source mode settings, the optimal color conversion can be performed by using the optimal light source information for each photographing situation, so that the accurate color reproduction can be realized. Especially, in the normal mode, the most important characteristics, such as color temperature and brightness, are compared each other for selecting the optimal light source information S (λ), and the color conversion parameters are calculated, so that the more correct color information can be obtained and the more correct color reproduction can be realized. Thus, when a pictorial processing, i.e., color enhancement, contrast conversion and etc., is performed by the image processing unit 35, image processing fitting with a user's sense can be realized, because the original color of the image is derived with high accuracy.

In addition, the present invention is not limited to the above embodiment, and various transformations and changes can be made. For example, the balancing coefficient v used in the case where both the spectrum Sp (λ) of the subject illumination light and the spectrum Sq (λ) from the light source sensor 18 are used for setting the light source information S (λ), can be calculated by using a reliability of light source estimation performed by the light source estimating unit 31, in addition to the camera information. For example, under the illumination of high intensity gas discharge lamps, such as lights of a gymnasium, reliability of light source estimation by the light source estimation unit 31 is usually low. Thus, a reliability coefficient is calculated when the light source estimation is performed and in case of low reliability, the balancing coefficient v is set so as to lower the weight of the spectrum Sp (λ) of the estimated light source information In this way, the light source information S (λ) can be set more precisely, hence, the more correct color reproduction can be realized.

Figure 9:
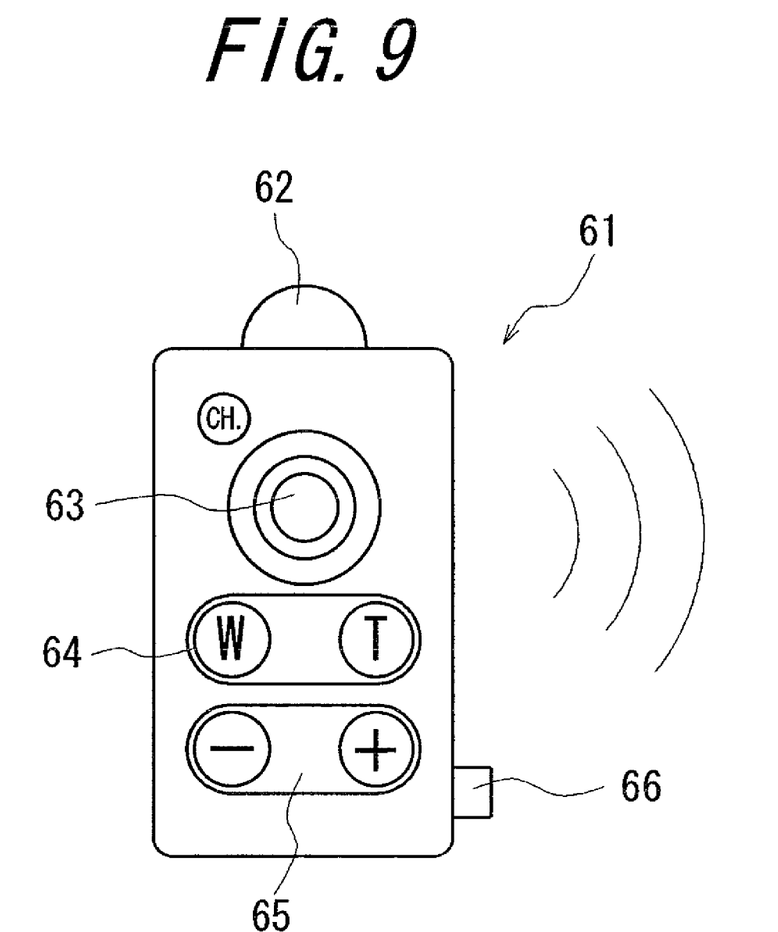
FIG. 9 shows an example in which a light source sensor is provided on a wireless remote controller.

Not only being provided directly onto the imaging device, the light source sensor 18 can be connected to the imaging device 11 through a predefined cable, such as an USB cable. As shown in FIG. 9, by providing a light source sensor 62 similar to the light source sensor 18 on the wireless remote controller 61 of the imaging device, the spectrum information detected by the light source sensor 62 can be wirelessly transmitted to the imaging device.

In FIG. 9, the wireless remote controller 61 has the light source sensor 62, a photographing button 63, a zooming operation button 64, a focusing operation button 65, and a transmission mode setting button 66. The transmission mode setting button 66, which sets the information to be sent upon the manipulation of the photographing button 63, makes selection from among the first transmission mode wherein the spectrum information detected by the light source sensor 62 is sent together with the release information, the second transmission mode wherein only the spectrum information detected by the light source sensor 62 is sent, and the third transmission mode wherein only the release information is sent, and set the selected mode as a transmission mode. In this way, when the light source sensor 62 is provided on the wireless remote controller 61, the light source sensor 18 of the camera body can be omitted by providing wireless remote controller 61 on the camera body of the imaging device replaceable.

Figure 10:
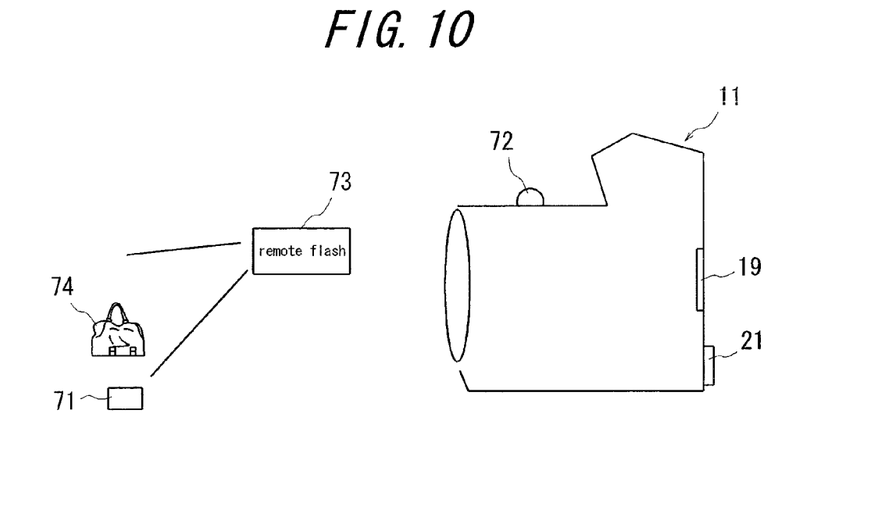
FIG. 10 shows an exemplary usage in which the light source sensor is configured as a remote light source sensor.
Figure 11:
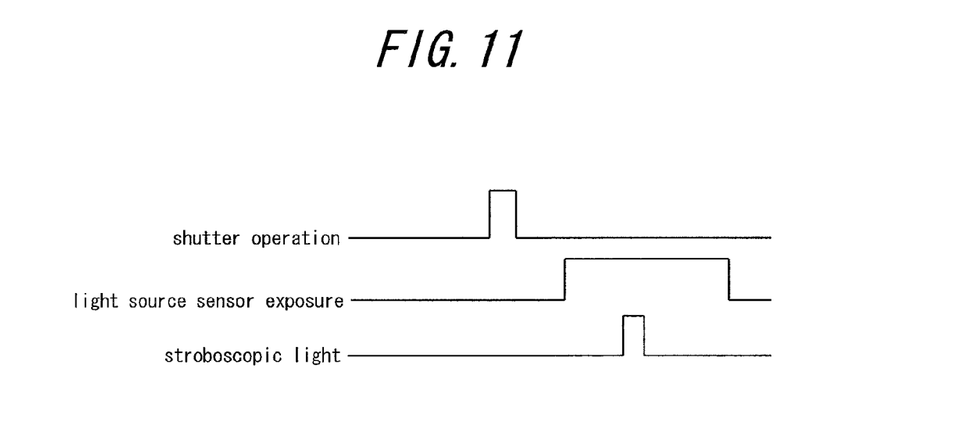
FIG. 11 is a timing diagram for explaining the exemplary usage shown in FIG. 10.

For example, the light source sensor can be configured as a remote light source sensor 71, which allows communication with the imaging device 11, as shown in FIG. 10. In such configuration, the subject 74 can be photographed by driving a remote flash 73 to synchronize with the shutter operation of the imaging device 11, through a transmitting/receiving unit 72 of the imaging device 11, as in the case of studio photographing. In this case, the remote light source sensor 71 is put in the place being exposed to the stroboscopic light, and the exposure operation of the remote light source sensor 71 can be initiated in synchronization with the shutter operation of the imaging device 11, as shown in FIG. 11, and during the exposure operation, stroboscopic light is emitted by the remote flash 73, and then, the spectrum information can be detected, and, as a result, the spectrum information can be transmitted to the imaging device 11, after photographing. In this way, accurate spectrum information of the actual illumination light in photographing with stroboscopic light can be acquired and the color reproducibility in photographing with stroboscopic light can be improved further.

Figure 12:
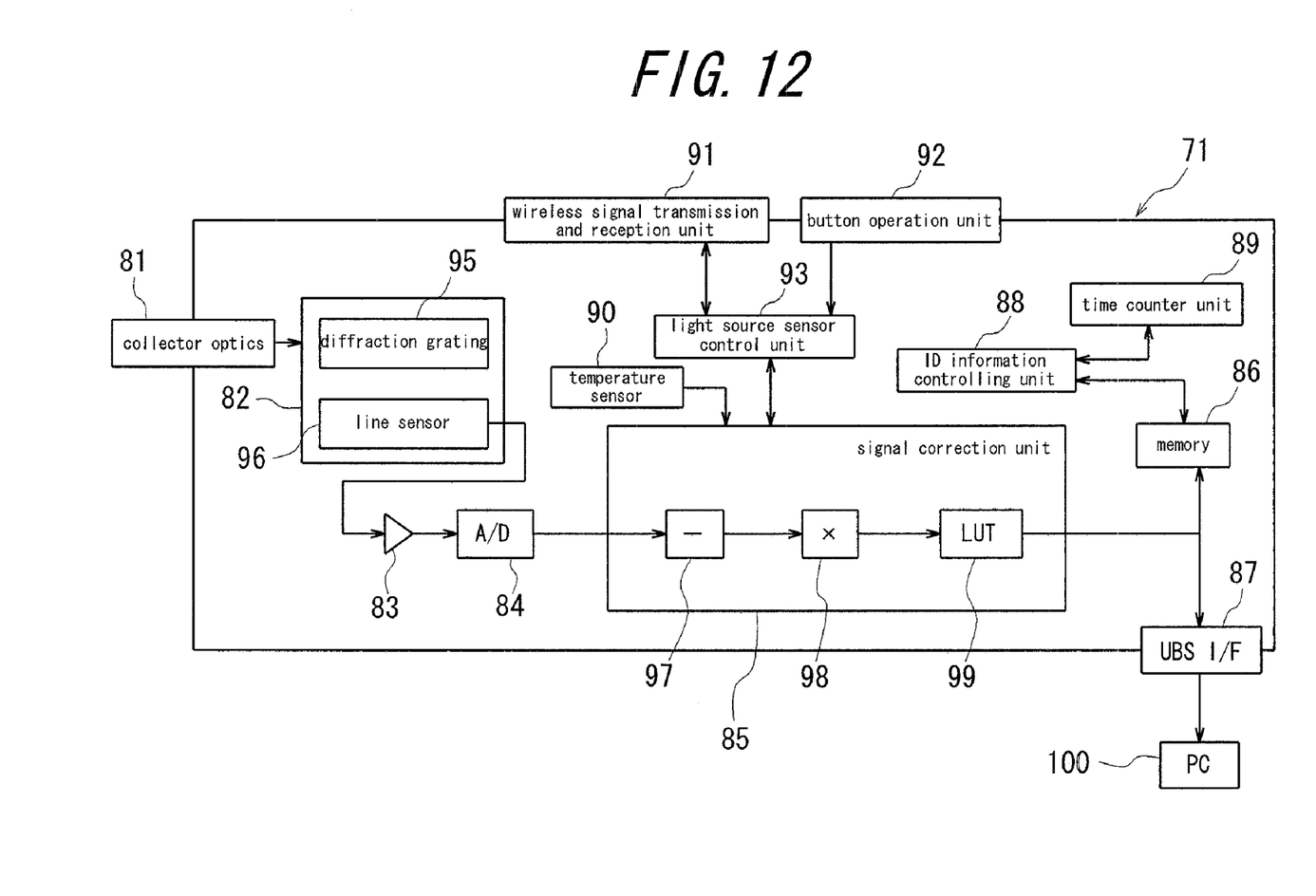
FIG. 12 is a block diagram illustrating an exemplary structure of an essential part of the remote light source sensor shown in FIG. 10.

FIG. 12 is a block diagram showing an example of an essential part of the remote light source sensor 71 in FIG. 10. This remote light source sensor 71 has a collector optics 81, a dispersion unit 82, an amplifier 83, an analog/digital (A/D) converter 84, a signal correction unit 85, a memory 86, an USB interface (USB I/F) 87, an ID information controlling unit 88, a time counter unit 89, a temperature sensor 90, a wireless signal transmission and reception unit 91, a button operation unit 92, and a light source sensor control unit 93 for controlling overall devices.

The collector optics 81 concentrates the illumination light and sends the light into a dispersion unit 82. The dispersion unit 82 has diffraction grating 95 and a line sensor 96, and diffracts the incident light by the diffraction grating 95 and receiving the resultant light by the line sensor 96, and subsequently, detects the spectrum information of the illumination light. The line sensor 96 consists of, for example, 128 pixels, and is configured to detect visible lights in every about 4 nm so as to detect the bright light spectrum of a fluorescent lamp. After amplified by the amplifier 83, the output of the line sensor 96 is converted to digital signal in the A/D converter 84, and is supplied to the signal correction unit 85.

The signal correction unit 85 has a subtractor 97, a multiplier 98 and a look-up table (LUT) 99. For example, the subtractor 97 subtracts an offset light of a dark current noise. Here, a subtraction value is adjusted according to the information form the temperature sensor 90, because the dark current noise varies significantly depending upon temperature. The multiplier 98 multiplies a gain coefficient for every pixel, and corrects the unevenness of sensitivity of line sensor 96. The LUT 99 corrects a nonlinearity of line sensor 96. Thus, the spectrum information of the illumination light can be detected with a high degree of accuracy, due to the signal correction unit 85.

The spectrum information being output from the signal correction unit 85 is stored in the memory 86. At the same time, the ID information control unit 88 attaches information from the time counter unit 89 as an ID information to the spectrum information. ID information, such as year, month, day, time, minute, and second, are attached, for example, as 20080311104530.ilu, and this is stored as a file name.

The wireless signal transmission and reception unit 91 receives the shutter signal form the imaging device 11, and, transmits the spectrum information stored in memory 86 to the imaging device 11, according to the operation of button operation unit 92. In addition, the spectrum information stored in the memory 86 is transmitted to a personal computer (PC) 100 and/or the imaging device 11, via the USB I/F 87.

According to the remote light source sensor 71 shown in FIG. 12, the correspondence relation between the image information acquired by the imaging device 11 and the spectrum information detected by the remote light source sensor 71 is certainly matched, because the time information is attached as the ID information when the detected spectrum information is stored to the memory 86. Therefore, an accurate color conversion is realized without mistaking the spectrum information to be used in the color conversion processing. Moreover, the spectrum information of the closest time to the photographing time can be used, so that the accurate color reproduction is realized under a situation wherein the illumination changes gradually.

In the imaging device 11 shown in FIG. 1, an image of the object is formed on the focusing screen 14 in the non-photographing status, and this subject image can be observed through the finder optics 15. The device can also provide an imaging element for live-view, so that the images taken by the imaging element can be displayed on the monitor 19 as live-view images. Moreover, the present invention can advantageously be adopted not only to single-lens reflex digital cameras but also to digital compact cameras.

What is claimed is:

1. An imaging device for taking a subject image formed by an imaging lens, wherein the subject image is photo-electrically converted into an image signal by an imaging element, comprising;
   a light source estimation unit for generating estimated light source information for estimating a light source of the subject, based on the image signal acquired by the imaging element,
   a light source sensor for detecting spectrum information of an illumination light,
   a light source sensor information calculation unit for generating light source sensor information including the spectrum information and time information at the detection of the spectrum information, based on the spectrum information,
   a color conversion parameter calculation unit for calculating a color conversion parameter of the image signal, based on the estimated light source information and the light source sensor information, and,
   a color conversion processing unit for performing color conversion processing of the image signal by using the color conversion parameter.

2. The imaging device as in claim 1, wherein the color conversion parameter calculation unit comprising;
   a light source setting unit for setting light source information of the subject, based on the light source sensor information and the estimated light source information, and,
   a parameter calculation unit for calculating the color conversion parameter, based on the light source information being set.

3. The imaging device as in claim 1, wherein the estimated light source information includes brightness, color temperature or spectrum information.

4. The imaging device as in claim 1, wherein the light source sensor information includes brightness or color temperature information.

5. The imaging device as in claim 2 further comprising;
   a light source mode setting unit for selecting one light source mode from a plurality of light source modes and setting it as a light source mode,
   wherein the color conversion parameter calculation unit calculates color conversion parameters according to the light source mode being set.

6. The imaging device as in claim 5, wherein the color conversion parameter calculation unit further comprises a processing data selection unit for selecting processing data to be used in the setting of the light source information in the light source setting unit, according to the light source mode being set.

7. The imaging device as in claim 1, wherein the light source sensor is provided replaceable on a body of the imaging device and includes means for transmitting the light source sensor information wirelessly.

* * * * *